Figure 1:
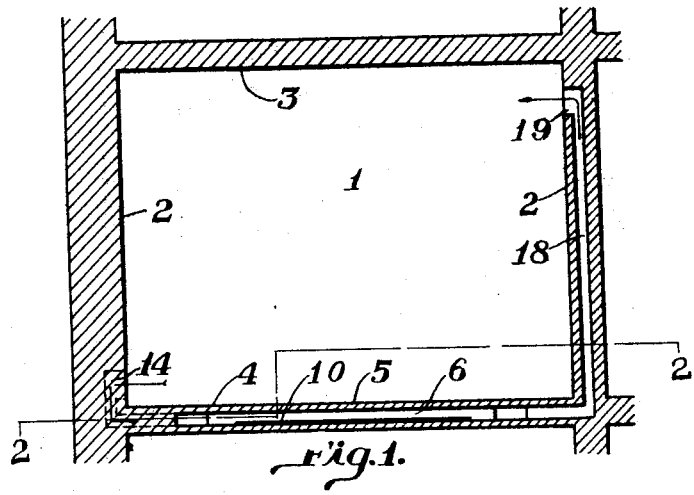

Aug. 30, 1932.          R. MAYER              1,874,778
                   ELECTRIC HEATING SYSTEM
                   Filed Sept. 1, 1930      2 Sheets-Sheet 1

Inventor
Rene Mayer
By H. S. McDowell
Attorney

Aug. 30, 1932.          R. MAYER          1,874,778
ELECTRIC HEATING SYSTEM
Filed Sept. 1, 1930          2 Sheets-Sheet 2

Inventor
Rene Mayer
By H. S. McDowell
Attorney

Patented Aug. 30, 1932

1,874,778

UNITED STATES PATENT OFFICE

RENE MAYER, OF COLUMBUS, OHIO, ASSIGNOR OF ONE-HALF TO HUGO NEYER, OF VIENNA, AUSTRIA

ELECTRIC HEATING SYSTEM

Application filed September 1, 1930. Serial No. 479,119.

This invention relates to an improved automatic electrically operated heating system which in certain of its specific aspects is particularly directed to the heating of residences and other buildings containing rooms adapted for human occupants. It is a primary object of the invention to provide a safe, comfortable and healthful heating system wherein an automatic adjustment of the moisture content or humidity of the heated area is maintained and to provide means wherein the object is primarily obtained which consists of glazed tile passages or conduits in which electrically heated resistance elements are disposed and wherein advantage is taken of the hygroscopic character of glazed tile walls to maintain substantially constant the moisture content in the room or rooms heated by the system.

The glazed tile of which, for example, ordinary tile stoves or heaters are constructed, is hygroscopic in character and, therefore, possesses a humidity regulating effect. Upon this fact is based the superiority of glazed tile stoves to hot water heating systems and particularly electric heating systems, in the matter of affording healthful heating for rooms. The present invention aims to utilize this property of tile in an electric, hot air, room heating system.

In accordance with the present invention the electric heating units are accommodated in hollow spaces, passages or conduits provided in room floors, ceilings or walls possessing tile construction so that said walls may function as radiators. The floors, ceilings or walls thus heated are made suitable for circulating warm air and delivering it to rooms by providing channels in said tiles and associating therewith induction and eduction pipes which open into the room or rooms to be heated.

Either the parts of the building housing, the heater or the inner surfaces of the induction and eduction pipes, leading to and from the heater, are composed of glazed tiling. The air to be warmed, while flowing through the heating apparatus, is brought into contact with these hygroscopic surfaces. When warmed, the tiles release the moisture present in their pores into the room atmosphere in quantities proportional to their increased temperature. Upon cooling, on the other hand, the said surfaces absorb water vapor from the air of the room in quantities proportional to their reduced temperatures. In consequence a relative humidity which is practically the same at every temperature can be achieved, and it is well known that this condition is very desirable for human comfort.

For a further understanding of the invention reference is to be had to the following description and the accompanying drawings, wherein:

Figure 1 is a vertical sectional view taken through the walls of a room and illustrating the heating system comprising the present invention formed in connection therewith.

Figure 2:
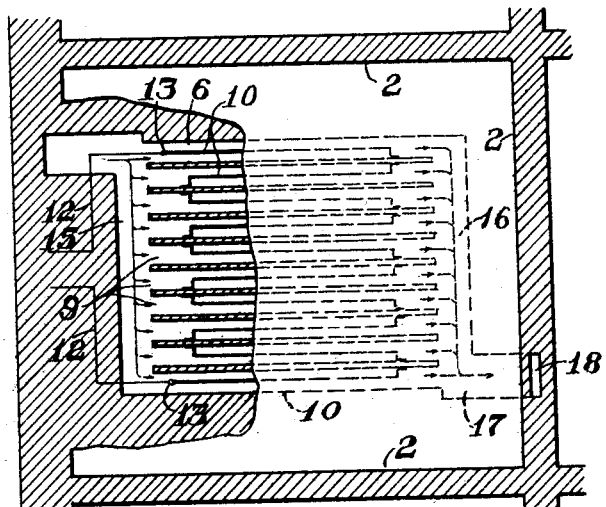
Figure 4:
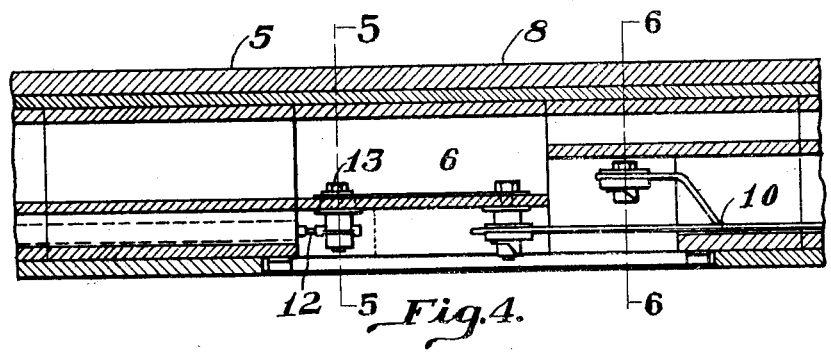
Figure 3:
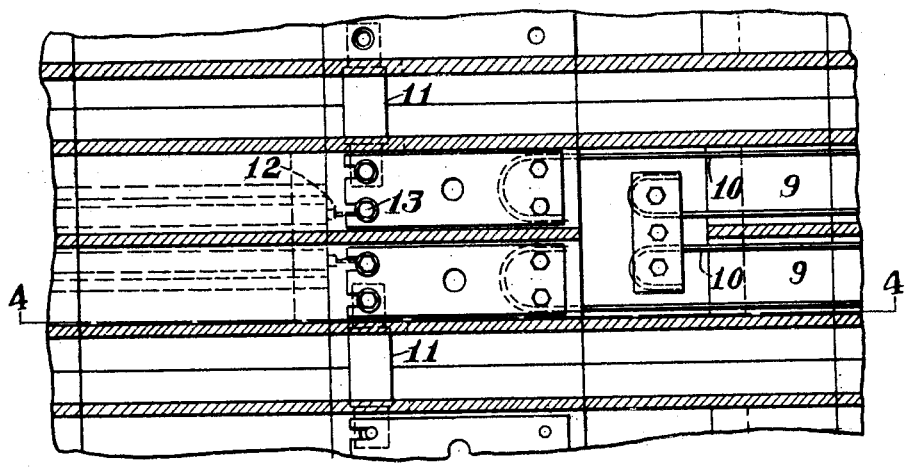
Figure 5:
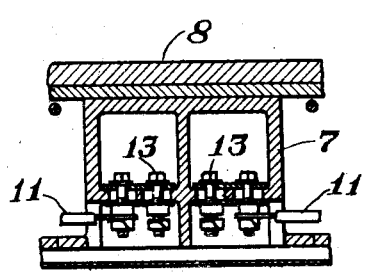
Figure 6:
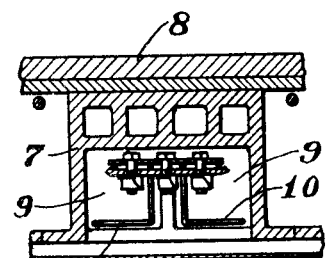

Figure 2 is a horizontal sectional view taken through the room on the line 2—2 of Figure 1, Figure 3 is a similar view on an enlarged scale showing more particularly the construction of the heating unit which is arranged in the flooring of the room, Figure 4 is a vertical longitudinal sectional view on the line 4—4 of Figure 3, Figure 5 is a transverse vertical section on the line 5—5 of Figure 4, and Figure 6 is a similar view on the line 6—6 Figure 4.

Referring more particularly to the drawings, the numeral 1 designates a room to be heated, a room being selected for convenience in description and illustration, but it should be understood that the invention is not limited merely to house or building heating but may be used in any capacity where elevated temperatures are desired. The room is provided with the usual vertical side walls 2, a ceiling 3 and a floor construction 4. The floor construction consists of a load supporting base 5 which may be of reinforced concrete, tile or other suitable materials used in the construction of floors. Arranged in a pocket or depression 6 formed in the base 5 are glazed hollow tile units 7 which may be disposed in one or more horizontal rows. Above the hollow tile unit 7 there is provided a surface flooring 8 which is preferably readily removable to provide convenient access to the unit 7. The flooring 8 may be formed from wood or mineral flooring compositions.

The tile 7 extends longitudinally of the pocket 6 and each tile unit is formed with a longitudinally extending open ended passageway 9 in which is positioned a longitudinally extending electric resistance and heating element 10, preferably formed from a chromium alloy wire which may be coiled or wound in any desired manner. The elements 10 of adjoining tiles are connected in series by means of fastening members 11 which pass through the adjoining vertical walls of the tile units. Current conducting leads 12 extend from the arbitrary terminals 13 and are connected in any desired manner with the end elements 10 in order that said elements may be serially heated either by direct or alternating current. It is within the scope of the invention to provide switches for controlling selectively the passage of current through the different elements 10 in order to regulate at will the temperature of the room atmosphere.

Provided in one or more of the vertical walls of the room is a cold-air intake 14 which at its upper end is in open communication with the room 1 adjacent to the flooring 4. The cold-air which settles to the bottom of the room, by reason of its increased weight, flows into the air intake 14 and is delivered to the transverse channel 15 communicating with the air inlet ends of the parallel passageways 9. The air is then directed through said passageways and contacts with the heating elements 10 which results in raising the temperature of the air to a desired point. From the passageways 9 the air is discharged into a transverse outlet channel 16 and is conducted from the channel 16 through a short horizontal duct 17 which leads to a vertically extending duct 18 passing upwardly through one of the side walls 2. The upper end of the duct 18 terminates in an outlet 19 in open communication with the room 1 adjacent to the ceiling 3 of the room. The heated air is thus delivered to the upper portion of the room and as it gradually loses temperature descends by virtue of its increased weight towards the floor. The circulation cycle is then repeated by the passage of the cool air into the intake 14.

The velocity of the circulating air, and consequently the speed at which the room may be heated can be artificially increased or regulated by the installation of a motor driven fan in one of the confined air passageways of the system. By providing suitable distributor conduits it is further possible to heat several rooms, either close-by or at a distance from the apparatus, and also to concentrate the heat or the humidity regulating effect of several of such systems upon one room. In artificial ventilating systems the arrangement which has been described will be further suitable for drying or the removal of vapor by virtue of the hygroscopic effect of the glazed tiling. Due to the heat capacity of the floors, ceilings and walls used as radiators in this system, the latter may also be used as a central source of heat supply and for widely separated rooms. Such a central heating plant may be used to particular advantage in such locations, for example, as factories or warehouses, where large areas are required to be heated.

In view of the present trend on the part of public utility companies in lowering electric current rates, the present invention has the advantage of being relatively economical to employ at a cost not materially in excess of other room heating systems using fluid fuels. Moreover, the system may be applied to the various rooms of a house and economy is often obtained by the fact that only certain rooms are heated while others may be left unheated and yet the utmost flexibility is provided in the matter of controlling the heat in any desired part of a house. From a standpoint of comfort the present invention provides a distinct improvement over former heating systems in that the room areas affected thereby possess a substantially constantly maintained humidity, which is an agreeable contrast to the moisture depleted atmospheres of rooms heated by ordinary steam, hot-water and hot-air heating systems. The tile resistance units 7 are preferably placed either in the floor or wall of a room so that they will be conveniently accessible at all times in order that repairs and replacements may be conveniently made.

What is claimed is:

1. The combination of a building room provided with a floor construction, vertical side walls and a ceiling, said floor construction being provided with a pocket, a plurality of hollow tile units positioned in said pocket, each of said units being formed to include an open ended longitudinal passageway, electric heating means arranged in said passageways, an air intake duct leading from said room adjacent to the floor thereof to said pocket to deliver cool air to said passageways, and a heated air delivery duct leading from said pocket through one of the vertical walls of said room for delivering heated air to said room adjacent the ceiling thereof.

2. An electric heating system for buildings comprising a floor construction having a horizontal chamber formed therein, a plurality of hollow tile units arranged in said chamber and provided with electric heating means, each of said units being provided with a longitudinally extending open ended passageway, said units being shorter in length than said chamber in order to produce transverse channels in said floor construction between the ends of said units and the corresponding walls of said chamber, means for conducting cold air from a room of said building into one of said channels of a longitudinal passage through said entire units, and means for conveying heated air from the other of said channels to said room.

3. The combination of a building room provided with a floor construction, vertical side walls and a ceiling, the floor construction being provided with a compartment, a plurality of hollow tile units positioned in said compartment, each of said units being formed to include an open ended longitudinal passageway, electric heating means cooperative with said passageway to heat the air therein, an air intake duct leading from said room adjacent to the floor thereof to said compartment to deliver cool air to said passageway, and a heated air delivery duct leading from said compartment to one of the vertical walls of said room for delivering heated air to said room adjacent the ceiling thereof.

4. An electric heating system for building, comprising a floor construction having a horizontal chamber formed therein, a plurality of hollow tile units arranged in said chamber, electric heating means cooperative with said chamber to effect the heating of the air therein, each of said units being provided with a longitudinally extending open passageway, said units being shorter in length than said chamber in order to produce transverse channels in said floor construction between the ends of said unit and the corresponding walls of said chamber, means for conducting cold air from the room of said building into one of said channels, and means for conveying heated air from the other of said channels to said room.

In testimony whereof I affix my signature.

RENE MAYER.